US 6,734,666 B2

(12) United States Patent
Voillat (10) Patent No.: US 6,734,666 B2
(45) Date of Patent: May 11, 2004

(54) METHOD OF DETERMINING THE ANGULAR POSITION OF A PERMANENT MAGNET ROTOR OF A POLYPHASE ELECTRIC MOTOR (75) Inventor: Jean-Pierre Voillat, Montavon (CH)

(73) Assignee: Bien-Air S.A., Bienne (CH)

( * ) Notice: Subject to any disclaimer, the term of this patent is extended or adjusted under 35 U.S.C. 154(b) by 0 days.

(21) Appl. No.: 10/149,210
(22) PCT Filed: Dec. 12, 2000
(86) PCT No.: PCT/EP00/12702
§ 371 (c)(1),
(2), (4) Date: Nov. 4, 2002
(87) PCT Pub. No.: WO01/45248
PCT Pub. Date: Jun. 21, 2001

(65) Prior Publication Data
US 2003/0141865 A1 Jul. 31, 2003

(30) Foreign Application Priority Data
Dec. 15, 1999  (EP) .............................. 99125017

(51) Int. Cl.[7] .............................. G01B 7/30; H02P 6/18; H02K 29/12
(52) U.S. Cl. .............................. 324/207.16; 324/207.25; 318/721; 318/724
(58) Field of Search .............................. 318/439, 717, 318/718, 721, 724, 798, 799, 805, 806, 659–661, 254, 466, 467, 489; 324/177, 207.12, 207.16, 207.17, 207.25; 310/68 B, 156.01, 168

(56) References Cited

U.S. PATENT DOCUMENTS

| | | | | |
|---|---|---|---|---|
| 5,796,235 A | * | 8/1998 | Schrodl et al. | 318/801 |
| 5,912,521 A | | 6/1999 | Ray | |
| 6,172,498 B1 | * | 1/2001 | Schmidt et al. | 324/207.12 |
| 6,208,110 B1 | * | 3/2001 | O'Meara et al. | 318/721 |
| 6,369,541 B1 | * | 4/2002 | Albert | 318/560 |
| 6,441,572 B2 | * | 8/2002 | Batzel | 318/254 |
| 6,555,977 B1 | * | 4/2003 | Du et al. | 318/254 |

FOREIGN PATENT DOCUMENTS

| | | |
|---|---|---|
| EP | 793337 A2 | 9/1997 |
| FR | 2697696 | 5/1994 |
| GB | 1005716 | 11/2001 |
| WO | WO 99/09645 | 2/1999 |
| WO | WO 00/04631 | 1/2000 |

* cited by examiner

Primary Examiner—Gerard R. Strecker
(74) Attorney, Agent, or Firm—Sughrue Mion, PLLC (57) ABSTRACT This method consists in supplying at least a first alternating signal, at a determined frequency, to one end of a stator coil and recuperating a measurement signal at a second end of said coil, said measurement signal being provided to electronic processing means, which are arranged to extract data relating to a periodic variation of the effective inductance of the stator coil. This variation is a function of the angular position of the rotor. By alternately carrying out such a measurement on the stator coils, three periodic curves can be extracted ($SPC_A$, $SPC_B$, $SPC_C$) defining a zigzag curve (70) allowing the angular position of the rotor to be determined.

15 Claims, 6 Drawing Sheets

$f_A = \approx 3MHz$   $f_A = \approx 2.8MHz$   $f_A = \approx 3MHz$   $f_A = \approx 2.8MHz$

METHOD OF DETERMINING THE ANGULAR POSITION OF A PERMANENT MAGNET ROTOR OF A POLYPHASE ELECTRIC MOTOR

BACKGROUND OF THE INVENTION

The present invention concerns a method for determining the angular position of the permanent magnet rotor of a multiphase electric motor including at least two stator coils. The exact determination of the angular position of the rotor of an electric motor is desired, or even necessary for several applications, in particular in the field of robotics and for devices with rotating tools such as those used in dental care and micro-surgery.

There is known an arrangement of three Hall sensors, which are offset by 120° and which provide substantially three sinusoidal curves offset by 120°, in order to determine the angular position of a permanent magnet rotor. It is also possible to arrange a position encoder on the shaft of the rotor to obtain a certain precision in determining the rotor's angular position. These arrangements require the addition of sensors which make the device more bulky, which is a major drawback for devices of small dimensions integrating micro-motors.

There is also known a generator providing induced voltage signals whose amplitude is proportional to the rotational speed of the rotor. Thus, for a three-phase permanent magnet rotor, it is possible to stop the power supply of the motor periodically for short intervals in order to extract induced voltage data allowing the position and/or speed of the rotor to be determined. This latter method for determining the angular position of a rotor has a major drawback given that the data can only be obtained when the rotor rotates at a certain speed, for example approximately 1,000 revolutions per minute. Thus, at low speed or for rotations of a relatively small angle, no data can be deduced on the basis of the induced voltage in the motor coils.

SUMMARY OF THE INVENTION

The object of the present invention is to overcome the drawbacks of the aforementioned prior art by avoiding an angular position detection device which is bulky and by providing a method for detecting the angular position of a rotor whatever its rotational speed and the angular path travelled.

This object is achieved by a method for determining the angular position of the permanent magnet rotor of a multiphase electric motor including stator coils which are respectively associated with the phases of this motor, each stator coil having a first end and a second end, wherein:

an alternating signal, having a determined frequency, is supplied to the first ends of at least two of said stator coils.

measurement signals in response to said alternating signal are recuperated, via conductor means connected to the second ends of said at least two stator coils, and supplied to electronic processing means, these measurement signals having a periodic amplitude modulation due to a periodic variation in the effective inductance of the corresponding coil as a function of the rotor's angular position, two measurement signals, coming from two different phases of the motor, thus having envelopes of corresponding amplitude modulations which are phase-shifted.

an extraction from each recuperated measurement signal of said envelope of amplitude modulation is made by said electronic processing means.

at least two of said envelopes which are phase-shifted are use for determining said rotor's angular position which is a function of said periodic amplitude modulation of each measurement signal.

The object of the present invention is also achieved by a method for determining the angular position of a permanent magnet rotor of a multiphase electric motor including stator coils which are respectively associated with the phases of this motor, each stator coil having a first end and a second end, wherein:

a first alternating signal and a second alternating signal, both having a determined frequency, are simultaneously and respectively supplied to the first ends of two of said stator coils, said second alternating signal being phase-shifted relative to said first alternating signal, a measurement signal, generated by mixing signals received at the second ends of said two stator coils in response to said first alternating signal and said second alternating sianal, is recuperated, via conductor means connected to these second ends, and supplied to electronic processing means, said measurement signal is processed by said processing means in order to obtain a periodic resulting signal which corresponds to a periodic phase variation of this measurement signal relative to said first alternating signal due to the periodic variation in the effective inductance of said two stator coils as a function of the rotor's angular position, the rotor's angular position is determined from said periodic resulting signal.

Within the developments having led to the present invention, the inventor has observed that this measuring signal includes data relating to a periodic variation in the effective inductance of the coil in which the alternating signal is supplied as a function of the angular position of the permanent magnet rotor, in particular of bipolar permanent magnet rotor.

The invention also concerns the electronic system for implementing the method according to the invention.

Via appropriate processing of the measuring signal, the method according to the invention allows the rotor's angular position to be determined with a high level of precision whatever its rotational speed and even when it is not moving. As a result of this method, it is possible to control the motor so as to make relatively small paths with a high level of precision.

BRIEF DESCRIPTION OF THE DRAWINGS

The present invention will be better understood with the aid of the following description of implementations of the method according to the invention and means for implementing the same, made with reference to the annexed drawings, which are given by way of non-limiting example, and in which.

DETAILED DESCRIPTION OF THE INVENTION

Figure 1:
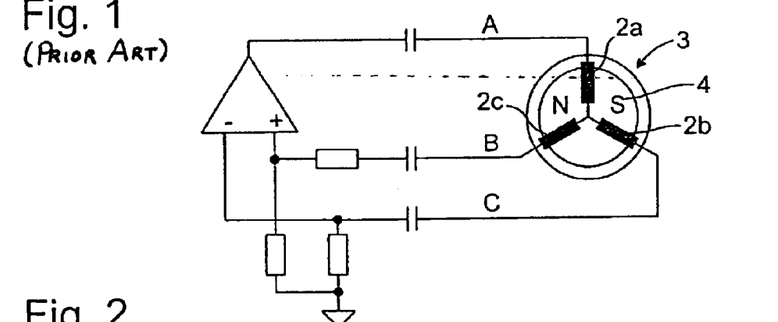
FIGS. 1 and 2 show the inductance variation in a stator coil via a frequency variation in an LC oscillator associated with the stator coils.
Figure 2:
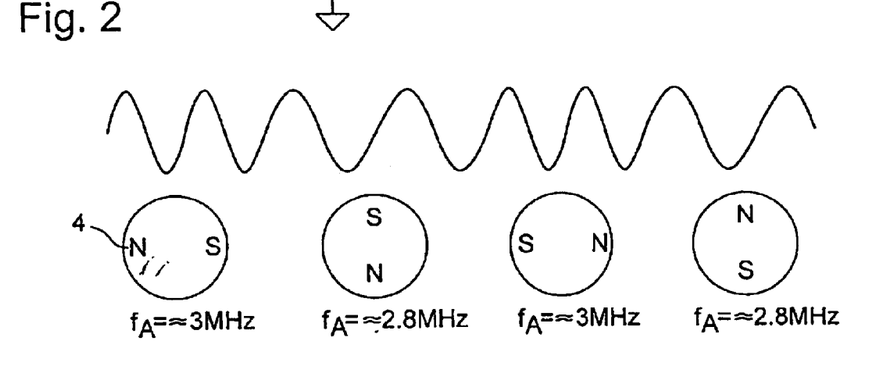

The electronic circuit shown in FIG. 1 forms an LC oscillator in which inductance is defined by coils 2a, 2b and 2c of an electric motor whose rotor 3 includes a bipolar permanent magnet 4. The circuit of FIG. 1 enables an oscillation to be maintained varying, in particular, between 2.8 MHz and 3 MHz as a function of the rotor's position, as is shown schematically in FIG. 2. It will be observed that this variation is substantially independent of the rotor's rotational speed or the value of the supply current supplied to the motor. A periodic variation is thus observed in the effective inductance of the coils of the electric motor essentially as a function of the rotor's position. Those skilled in the art can design an electronic circuit for measuring the frequency of an oscillator of the type shown in FIG. 1 in order to deduce therefrom data relating to the rotor's angular position. International Patent Application No. WO 00/04631 by the same inventor uses the measurement of the frequency variation of two oscillators associated with the stator coils. For more ample explanations concerning the electronic circuit of FIG. 1, reference will also be made to European Patent Application No. EP 99125017.6 whose priority is claimed. In this European Patent Application, rotor embodiments are also disclosed like those shown here in FIGS. 3 and 4 for increasing the periodic variation in the effective inductance of the coils as a function of the rotor's angular position.

Figure 3:
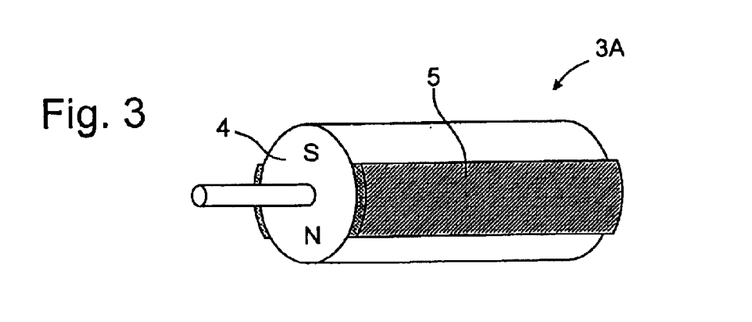
FIGS. 3 and 4 show respectively two embodiments of the rotor used within the scope of the present invention.
Figure 4:
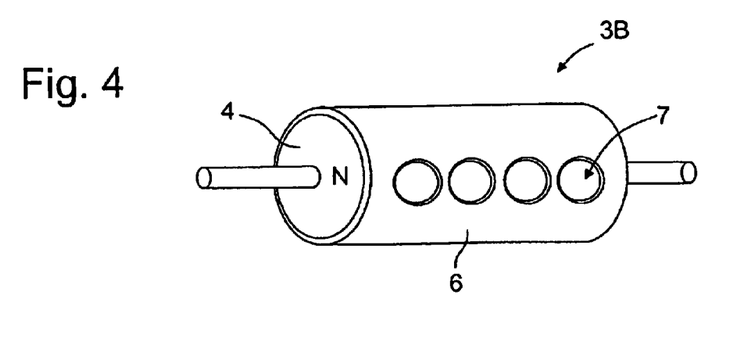

FIGS. 3 and 4 show two alternative embodiments of a rotor 3A and 3B fitted to an electric motor associated with an angular position detection system according to the invention. The Applicant has observed that the arrangement of a metal, in particular a non-magnetic metal, partially on the surface of the rotor's permanent magnet, increases the periodic variation in the effective inductance of the stator coils. Rotor 3A has two metal strips 5 offset by 180°, only one of the two strips being visible in FIG. 3. Rotor 3B has a metal cylinder 6 surrounding permanent magnet 4 and in which are provided two rows of holes 7 arranged axially and also offset by 180°. In this variant shown by way of non-limiting example, the N-S magnetic axis is aligned on the radial direction of holes 7. For more ample details, reference will also be made to the aforementioned European Patent Application.

Figure 5:
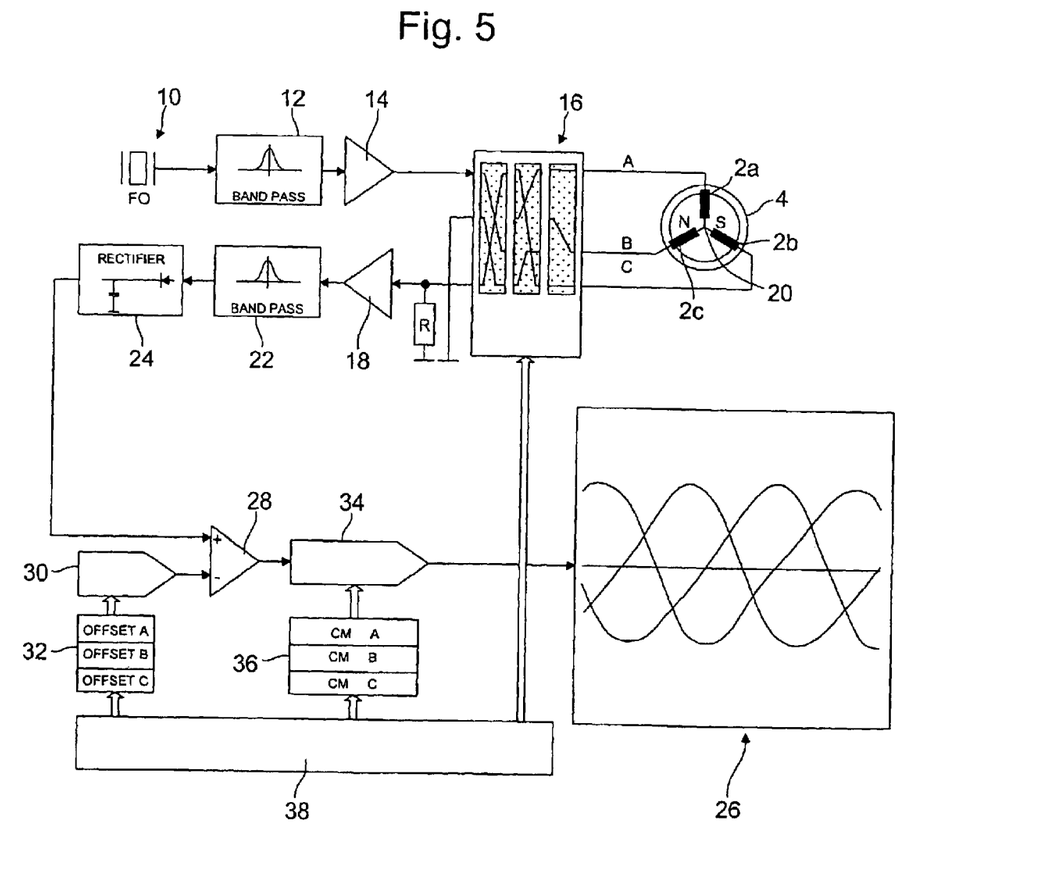
FIG. 5 partially shows a first embodiment of a system for detecting a rotor's angular position according to the invention.

With reference to FIG. 5, a first implementation of the method according to the invention and the system for implementing said method will be described hereinafter.

A frequency generator 10 provides through a band-pass filter 12 an alternating signal having a determined frequency, which is selectively supplied to a first end of one of the three stator coils 2a, 2b and 2c. Next, a measurement signal is recuperated via another of these coils, which is connected to the second end of the coil into which the alternating signal is supplied. This measurement signal is provided to electronic processing means including an amplifier 18 at the input of which there is provided a resistor R. Given that the input impedance of amplifier 18 is very high, resistor R of lower resistance value is used to lower the impedance at the input of said amplifier to prevent the appearance of disturbance in the measurement signal. It will be noted however, that the resistance value of resistor R is much higher than the resistance value of a coil so that the voltage signal forming the measurement signal at the input of amplifier 18 substantially corresponds to the voltage of the signal having the frequency of said alternating signal at the middle point 20 of the three stator coils.

In order to obtain the cleanest possible measurement signal, the latter passes through a bandpass filter 22 at the output of which an alternating signal can be observed, whose envelope has a modulation which is a function of the rotor's angular position. In order to extract the data relating to this angular position, the measured signal passes, in a conventional manner, through a rectifier 24 in order to obtain an electric signal corresponding to the aforementioned envelope. Given that the alternating signal is successively sent, in a cyclical manner, over the three phases A, B and C of the electric motor, three measurement signals are obtained which define three curves during rotation of the rotor, these curves having a substantially sinusoidal shape and being offset or phase shifted by 120° as appears in window 26. However, it has been observed that, given that the three stator coils are not always identical, the three measurement curves obtained have a different offset and amplitude. Thus, means are provided for correcting the offset and amplitude of each curve. These means include a summing operational amplifier 28 to one input of which the measured signal is provided, whereas a specific offset signal for each of the three phases A, B and C is supplied to its second input via a digital-analogue converter 30. The specific offsets of the three phases on which measurements are made are stored in a register 32. Finally, the measured signal is provided to a multiplier digital-analogue converter 34 whose multiplication coefficient CM is specifically selected for each of the three phases in a register 36. The activation of analogue switches 16 and selection of the offset and coefficient of multiplier CM are performed simultaneously in a cyclical manner using an electronic control circuit 38.

Thus, using the three measurement curves defining three measurement values for each angular position of the rotor, it is possible to determine this angular position precisely. If the curves are substantially sinusoidal, this determination can occur digitally without any great difficulty. If this is not the case, methods for efficiently determining the angular position of the rotor will be described hereinafter with reference to the preferred embodiment of the invention.

A study of the sensitivity of the system described hereinbefore for implementing the angular position detection method according to the invention has shown that it has certain drawbacks. First, the electronic circuits for obtaining three measurement curves having the same offset and same amplitude are relatively complex. Next, the system environment, in particular the electric cables associated with the motor, modifies from one case to another the measured amplitude modulation and the offset of the measurement curves. Thus, a second preferred implementation of the invention and embodiment of the electronic system associated therewith, wherein a phase modulation is used, will be described hereinafter.

According to the preferred implementation of the invention, which will be described hereinafter with reference to FIGS. 6 to 10, a first signal $SF_A$ is supplied to a first phase of the motor, i.e. to a first input of a stator coil and a second alternating signal $SF_B$ of the same frequency FO is simultaneously supplied to a second phase, i.e. to a first end of a second coil. Signal $SF_B$ is offset relative to signal $SF_A$ by means of a phase-shift circuit 42. The phase shift between these two alternating signals is predefined. These signals $SF_A$ and $SF_B$ are supplied to the first ends of two coils through two bandpass circuits 12 and 13 and amplifiers 14 and 15 as in the first embodiment described hereinbefore.

Figure 6:
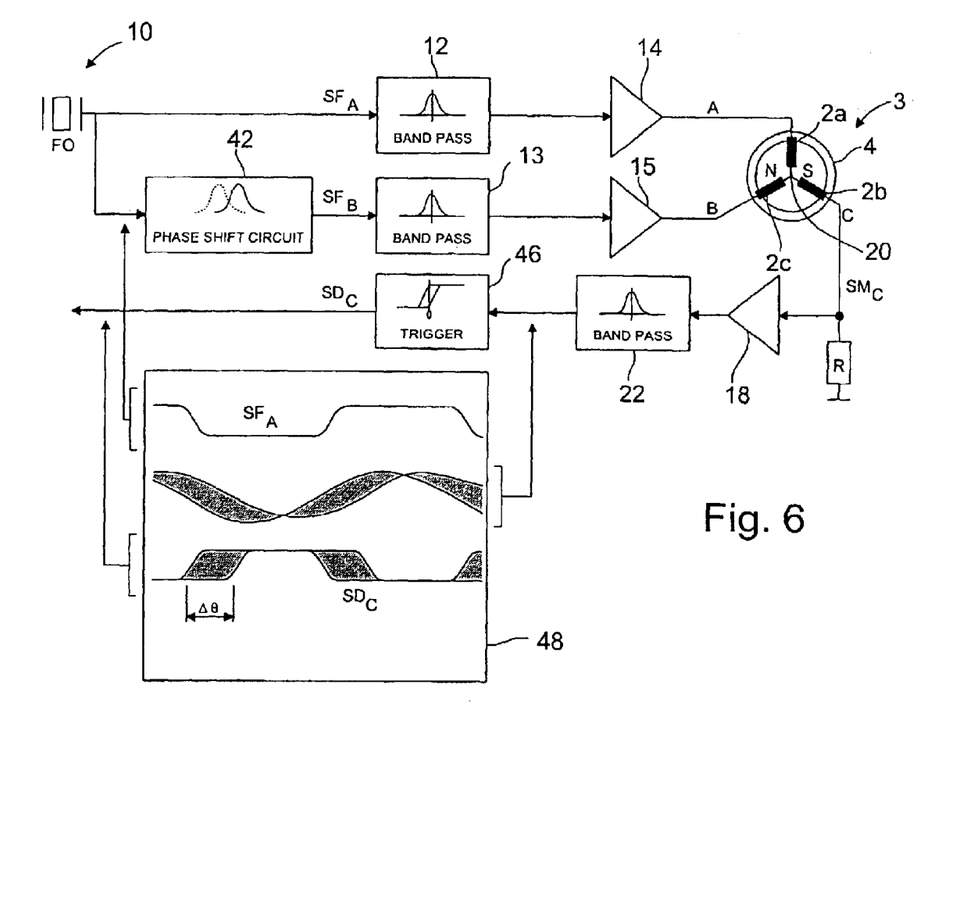
FIGS. 6 to 9 show a second embodiment of a detection system according to the invention, used to explain a preferred implementation of the rotor position detection method according to the invention.
Figure 7:
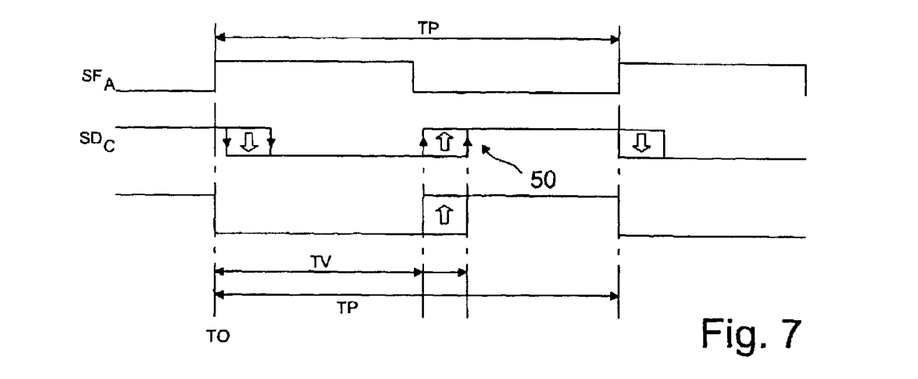

Via the third coil associated with the third phase of the motor, a measurement signal $SM_c$ is obtained which is supplied to electronic processing means, in particular a converter, in order to extract the data due to the periodic inductance variation as a function of the rotor's angular position. Measurement signal $SM_c$ is formed by mixing the signals received at point 20 of the electric connection between the three stator coils. In response to the first and second alternating signals $SF_A$ and $SF_B$, a voltage measurement signal is thus obtained, the frequency of which corresponds to the frequency FO of these signals $SF_A$ and $SF_B$. Signal $SM_c$ is amplified by amplifier 18 and filtered at frequency FO by filterinE means 22 before being supplied to a trigger 46 which then supplies a digitalised signal SDC, which is an image of measurement signal $SM_c$.

Provided signal SFA and the envelope of measurement signals $SM_C$ amplified for a half revolution of bipolar magnet 4 of rotor 3 are shown in window 48. It will thus be observed that the phase of signal $SM_C$ relative to alternating signal $SF_A$ varies as a function of the rotor's angular position α between two extreme values defining a maximum phase shift of Δθ. By digitalising the substantially sinusoidal curves of signal $SM_C$, trigger 46 allows the phase shift variation between supplied signal $SF_A$ and measurement signal $SM_C$, to be measured, as is shown schematically in FIG. 7. Alternating signal $SF_A$ has a time period TP whose leading edge defines an initial reference time T0. Digitalised measurement signal $SD_C$ has a leading edge 50 which occurs after a variable time interval TV from initial time T0.

Figure 8A:
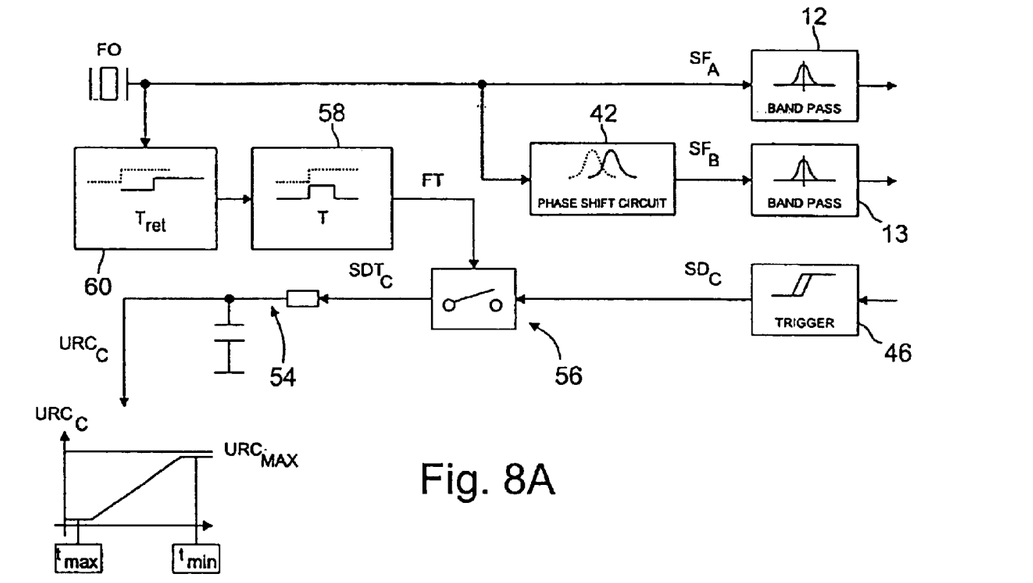
Figure 8B:
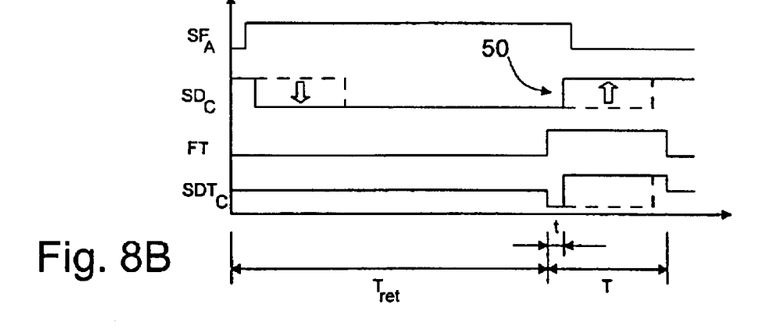
Figure 9:
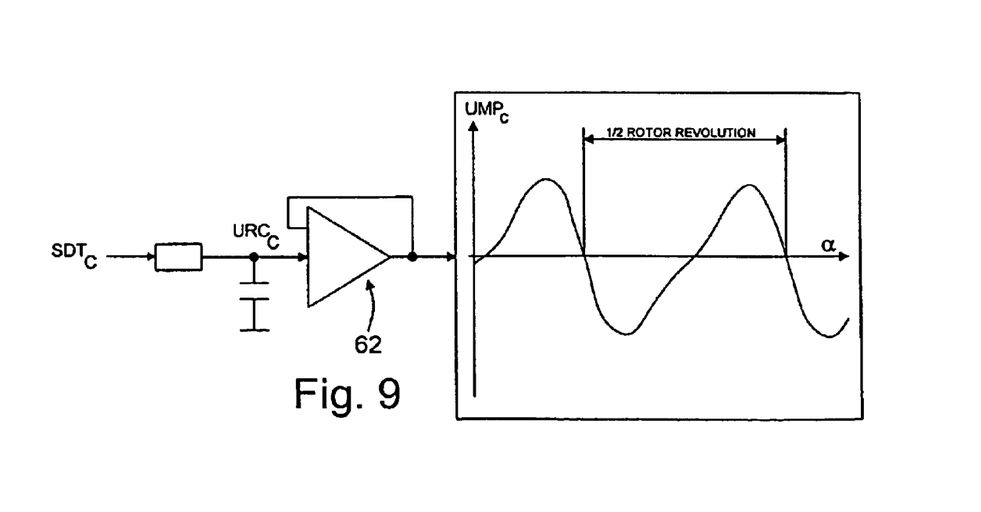
Figure 10:
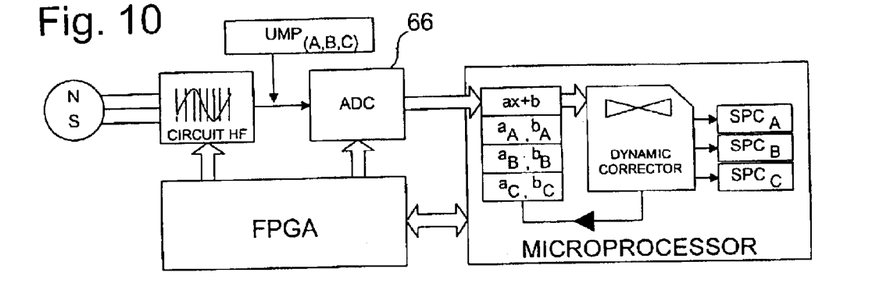
FIG. 10 shows schematically a circuit for correcting the measurement curves used in the method according to the invention.

It is the variation in interval TV that contains data relating to the effective inductance variation. In order to exploit this data most efficiently, two measurements are provided, as shown in FIG. 8A. First, an RC circuit 54 is provided, for supplying a voltage proportional to the ratio TV/TP. In order to increase the variation in voltage signal $URC_c$, a three-state gate 56 is introduced to enclose the position variation of leading edge 50 within a time window T whose value is a little higher than the maximum TV variation. Thus, the variation in signal $URC_c$ substantially varies between a low value and a value close to URCmax. The time window occurs after a predefined delay time $T_{ref}$. Three-state gate 56 is activated by a control signal FT supplied through a "one shoot" circuit 58 by a delay circuit 60. Circuits 58 and 60 are known to those skilled in the art. FIG. 8B shows the various signals occurring in the processing of the measurement signal to measure its phase variation. The electronic processing means thus define a phase discriminator and supply a voltage signal whose variation corresponds to the phase variation of measurement signal $SM_c$. As shown in FIG. 9, signal $URC_c$ is also supplied to an operational amplifier 62 so as to reduce the impedance of the measurement signal at the output of the amplifier. Thus signal $UMP_c$ variable as a function of the angular position of the rotor and having a period corresponding to half a revolution of this rotor is obtained. Thus the measured and processed signal allows a curve having a periodic variation and a shape like a sinusoidal curve to be obtained.

It will be noted that the phase shift introduced by circuit 42 between the two signals supplied for measurement has a value which is preferably between 140 and 160°. This range of values corresponds to a compromise between an optimum phase variation in the measured signal and its voltage.

In order to measure the rotor's angular position efficiently and in particular its rotational direction, it is necessary to have at least two measurement curves offset in relation to each other. In order to do this, one proceeds in a similar manner to the first embodiment previously described in FIG. 5, by supplying the first and second alternating signals cyclically and successively to two of the three stator coils so as to obtain three measurement signals whose evolution, as a function of the rotor's position, respectively defines three measurement curves offset by 120° with respect to each other. In the present case, measurement signals are successively recuperated on each of the three phases A, B and C by supplying the two offset alternating signals to the two other phases. Those skilled in the art know how to make circuits for recuperating, cyclically and successively in relatively short time intervals, the three measurement signals at the second ends of the three stator coils defining the three phases of the electric motor. In order to do this, it is possible to use, in particular, operational amplifiers with a high impedance three-state output, for example of the CLC430 type of the National company. A set of switches of this type can be controlled by an "FPGA" switching circuit of the XC4008 type of the Xilinx company.

Thus, for each angular position of the rotor, it is possible to obtain three measurement signals. By successive measurements, the rotation of the rotor defines three periodic measurement curves generated by the phase modulation or phase shift variation of these measurement signals in the three coils of the electric motor as a function of the angular position of the permanent magnet of the rotor.

Given the slight lack of symmetry between the three phases, using a dynamic corrector, correcting the measurement signals so that the measurement curves generated have the same offset and the same amplitude (see FIG. 10) is proposed. In order to do this, signal UMP supplied by each of the three phases is supplied to a converter 66 which is also controlled by switching the aforementioned FPGA circuit. Dynamic correction is performed using a microprocessor which supplies corrected measurement values SPC for each of the three phases. Three curves $SPC_A$, $SPC_B$ and $SPC_C$, offset by 120°, are thus obtained.

Figure 11:
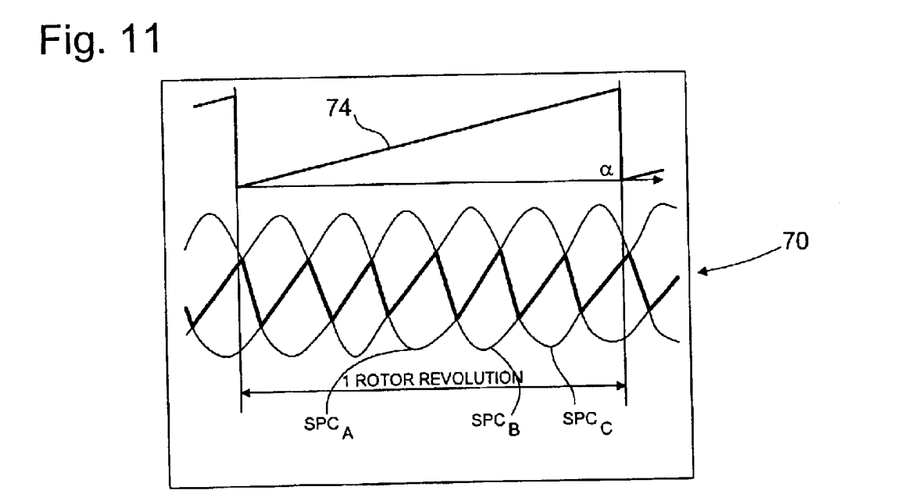
FIGS. 11 and 12 show a method according to the invention for selecting a measurement value among three measuring signals obtained.

Within the scope of the present invention, a precise and efficient method for determining the rotor's position has been conceived. This method will be explained hereinafter with reference to FIGS. 11 to 14. It was observed that in the peak regions of the measurement curves, given the relatively small slope, the accuracy of measurement decreases. In order to eliminate these regions, according to the invention, for a given position of the rotor, the measurement signal whose value is located between the values of the other two measurement signals, or is equal to the value of one of these two other measurement signals, is selected from the three measurement signals. This means that, for a given angular position a single measurement value is selected, on a segment of the zigzag curve 70 defined by the bold line in FIG. 11.

Figure 12:
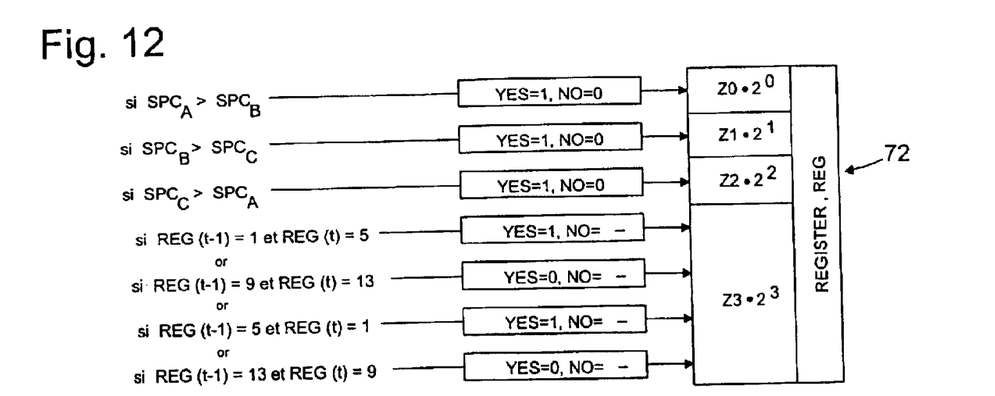

Over a half-revolution of the rotor, the angular position is defined univocally, using an algorithm to select segments of curve 70, given in FIG. 12 in the first three lines. Indeed, for a measurement value given by one of curve segments 70 belonging to a determined phase, this value can correspond over a half-revolution to only two angular positions. For these two angular positions, the two values taken by one of the other two measurement signals are respectively lower than and higher than said value of curve 70. The last four conditions given by the algorithm defined in FIG. 12, to determine the rank of the segment of zigzag curve 70 over a complete revolution of the rotor, take account of the evolution of the measurement signals over time. In other words, the value REG put in register 72 at time t-1 is stored in a memory and the evolution of value REG at a time t allowing two successive half-revolutions to be distinguished depending on the logic state of bit z3 is observed. Thus, by giving a different rank to each segment of curve 70 over a rotational revolution of the rotor, it is then possible to determine, for a measurement value selected on one of the segments of curve 70 whose rank is determined, the angular position of the rotor univocally over a complete revolution, as is shown by curve 74 in FIG. 11.

In order to determine the value of the angular position as a function of the measurement value selected on zigzag curve 70, two variants are proposed. The first variant defines an analytical method schematically shown in FIG. 13. For a given electric motor or a particular type of motor, a reference zigzag curve is defined corresponding to curve 70. This reference curve is given using an analytical formula.

Figure 13:
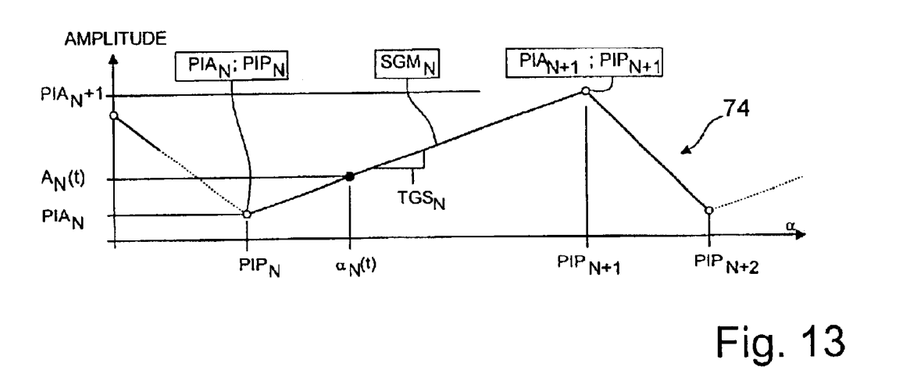
FIG. 13 shows a first variant for determining the rotor's angular position as a function of the measurement value selected.

In the variant proposed in FIG. 13, reference zigzag curve 74 is formed of a succession of linear segments defining an approximation of the corresponding real curve. Thus, in the reference curve, the segments of curve 70 are associated with linear segments whose parameters are defined for example using a linear regression on the real measurement curves obtained for the motor of type of motor concerned. For each linear segment $SGM_N$ of rank N, extreme points ($PIP_N$; $PIA_N$) and ($PIP_{N+1}$; $PIA_{N+1}$) and slope $TGS_N$ are predefined and introduced into the electronic processing means. For a segment whose rank N is determined, the angular position $\alpha_N(t)$ as a function of measurement value $A_N(t)$ is given by the following analytical formula:

$$\alpha_N(t) = \frac{A_N(t) - PIA_N}{TGS_N} + PIP_N$$

The second variant for determining the angular position consists in a comparative method. A plurality of reference values, defining a reference curve over at least a half-revolution of the rotor, is introduced into a correspondence table 76. A predefined rotor angular position value, also stored in table 76, corresponds to each reference value. Once the segment of curve 70 has been determined, the angular position is obtained by determining which is the closest reference value to the selected measurement value.

Figure 14:
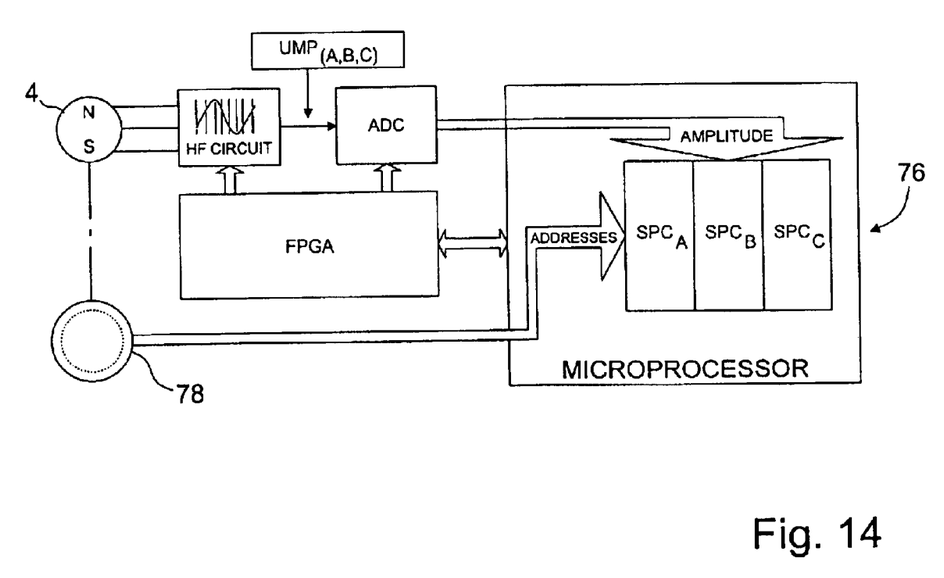
FIG. 14 shows schematically the means for implementing a second variant for determining the rotor's angular position as a function of the measurement value selected.

In order to define the aforementioned reference values, a position encoder 78 can be used and the curves UMP obtained for each phase by digitalising them by means of a convener 76 as shown schematically in FIG. 14.

Finally, although the implementations of the method according to the invention have been described with reference to motors with stator coils arranged in a star, this method also applies to a triangular connection of the stator coils.

What is claimed is:

1. A method for determining the angular position of the permanent magnet rotor of a multiphase electric motor including stator coils which are respectively associated with the phases of this motor, each stator coil having a first end and a second end, comprising the steps of:

supplying an alternating signal, having a determined frequency, to the first ends of at least two of said stator coils, recuperating measurement signals, in response to said alternating signal, via conductors connected to the second ends of said at least two stator coils, and supplying the measurement signals to electronic processing means, the measurement signals having a periodic amplitude modulation due to a periodic variation in the effective inductance of the corresponding coil as a function of the rotor's angular position, two measurement signals, coming from two different phases of the motor, thus having envelopes of corresponding amplitude modulations which are phase-shifted, extracting, by said electronic processing means, from each recuperated measurement signal a corresponding one of said envelopes of amplitude modulation, and using at least two of said phase-shifted envelopes for determining said rotor's angular position as a function of said periodic amplitude modulation of each measurement signal.

2. The method according to claim 1, further comprising the step of supplying said alternating signal successively and cyclically to the first ends of said at least two stator coils.

3. The method according to claim 1, wherein said motor has three phases, and further comprising the step of supplying said alternating signal to the first ends of three stator coils respectively associated with the three phases.

4. The method according to claim 2, wherein said motor has three phases, and further comprising the step of supplying said alternating signal to the first ends of three stator coils respectively associated with the three phases.

5. A method for determining the angular position of a permanent magnet rotor of a multiphase electric motor including stator coils which are respectively associated with the phases of this motor, each stator coil having a first end and a second end, comprising the steps of:

simultaneously and respectively supplying a first alternating signal and a second alternating signal, both having a determined frequency, to the first ends of two of said stator coils, said second alternating signal being phase-shifted relative to said first alternating signal, recuperating a measurement signal, generated by mixing signals received at the second ends of said two stator coils in response to said first alternating signal and said second alternating signal, via conductors connected to these second ends, and supplying the measurement signal, to electronic processing means, and processing said measurement signal by said processing means to obtain a periodic resulting signal which corresponds to a periodic phase variation of the measurement signal, relative to said first alternating signal, due to the periodic variation in the effective inductance of said two stator coils as a function of the rotor's angular position, and determining the rotor's angular position from said periodic resulting signal.

6. The method according to claim 5, wherein said electric motor is a three-phase motor and includes three coils respectively associated with three phases, further comprising the step of supplying said simultaneous first and second alternating signals cyclically and successively to the three coils so as to obtain three measurement signals whose evolution, as a function of the position of the rotor, respectively defines three measurement curves similar to sinusoidal curves offset by 120° with respect to each other.

7. The method according to claim 6, further comprising the step of causing said electronic processing means to correct the amplitude and offset of each measurement curve so as to obtain three corrected measurement curves having the same amplitude and centered on the same mean value, said three corrected measurement curves defining corrected measurement values for the three measurement signals.

8. The method according to claim 7, further comprising the step of causing said electronic processing means:

- to select, for a given position of the rotor, the measurement signal from said three measurement signals whose corrected value is situated between the corrected values of the two other measurement signals or is equal to one of said two other corrected values, said corrected values of said selected signal defining a selected measurement value;
- to determine the rank of a curve segment from the plurality of curve segments forming a zigzag curve corresponding to all measurement values capable of being selected over a period corresponding to a complete rotation of the rotor; and
- to determine, for the selected measurement value and the segment of determined rank, univocally the value of said angular position.

9. The method according to claim 8, further comprising the steps of providing, in a memory of said electronic processing means, predefined parameters of an analytical formula defining a reference zigzag curve, and determining said angular position by a calculation algorithm by introducing said selected measurement value into said analytical formula.

10. The method according to claim 9, further comprising the step of forming said reference zigzag curve by a succession of linear segments.

11. The method according to claim 8, further comprising the steps of including in said electronic processing means a correspondence table into which a plurality of predefined reference values are introduced, introducing a predefined angular position value for each reference value into said correspondence table, and obtaining said angular position by determining which is the closest reference value to said selected measurement value.

12. The method according to claim 5, further comprising the step of arranging said electronic processing means to follow the evolution of the rotation of the rotor so as to provide the angular position of the rotor univocally over a range of 360°.

13. The method according to claim 8, further comprising the step of arranging said electronic processing means to follow the evolution of the rotation of the rotor so as to provide the angular position of the rotor univocally over a range of 360°.

14. The method according to claim 6, further comprising the step of supplying said simultaneous first and second alternating signals successively and cyclically in relatively short time intervals.

15. The method according to claim 6, further comprising the step of providing a set of switches, controlled by a switching circuit of the "FPGA" type, to carry out the step of supplying said first and second alternating signals.

* * * * *